R. E. ROBESON.
SUPPLEMENTAL SEAT FOR MOTOR CYCLES.
APPLICATION FILED OCT. 7, 1912.

1,066,324.

Patented July 1, 1913.

2 SHEETS—SHEET 1.

Witnesses

R. E. Robeson,
Inventor by C. A. Snow & Co.
Attorneys

R. E. ROBESON.
SUPPLEMENTAL SEAT FOR MOTOR CYCLES.
APPLICATION FILED OCT. 7, 1912.
1,066,324.
Patented July 1, 1913.
2 SHEETS—SHEET 2.
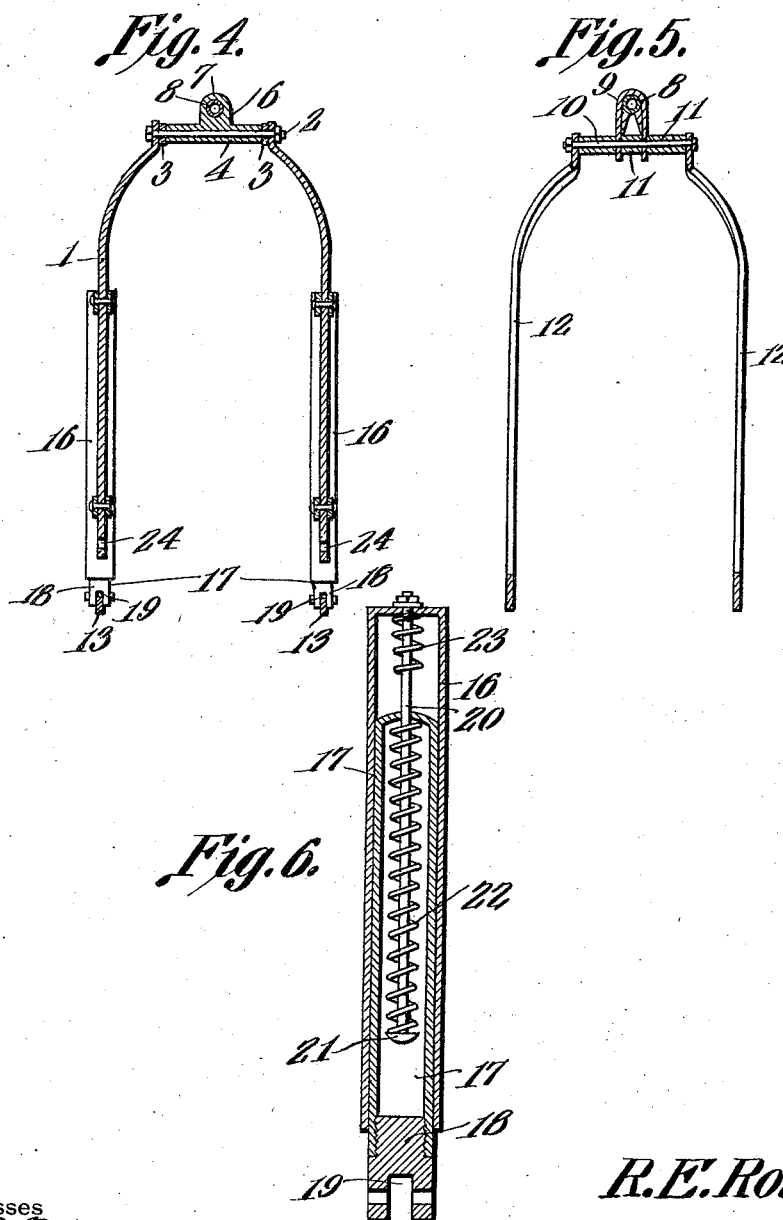
R. E. Robeson, Inventor

UNITED STATES PATENT OFFICE.

RUSSELL E. ROBESON, OF CLEVELAND, OHIO.

SUPPLEMENTAL SEAT FOR MOTOR-CYCLES.

1,066,324. Specification of Letters Patent. Patented July 1, 1913.

Application filed October 7, 1912. Serial No. 724,408.

*To all whom it may concern:*

Be it known that I, RUSSELL E. ROBESON, a citizen of the United States, residing at Cleveland, in the county of Cuyahoga and State of Ohio, have invented a new and useful Supplemental Seat for Motor-Cycles, of which the following is a specification.

This invention relates to attachments for motorcycles and the like, its object being to provide a seat carrying structure which can be applied readily and securely to various types of motorcycles and which, when in position, provides accommodation for a second rider directly back of the operator of the machine.

A further object is to provide means whereby the saddle and pedals of the attachment are permitted to shift downwardly and upwardly against the action of cushioning means and whereby undesirable jolting of the rider is prevented.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
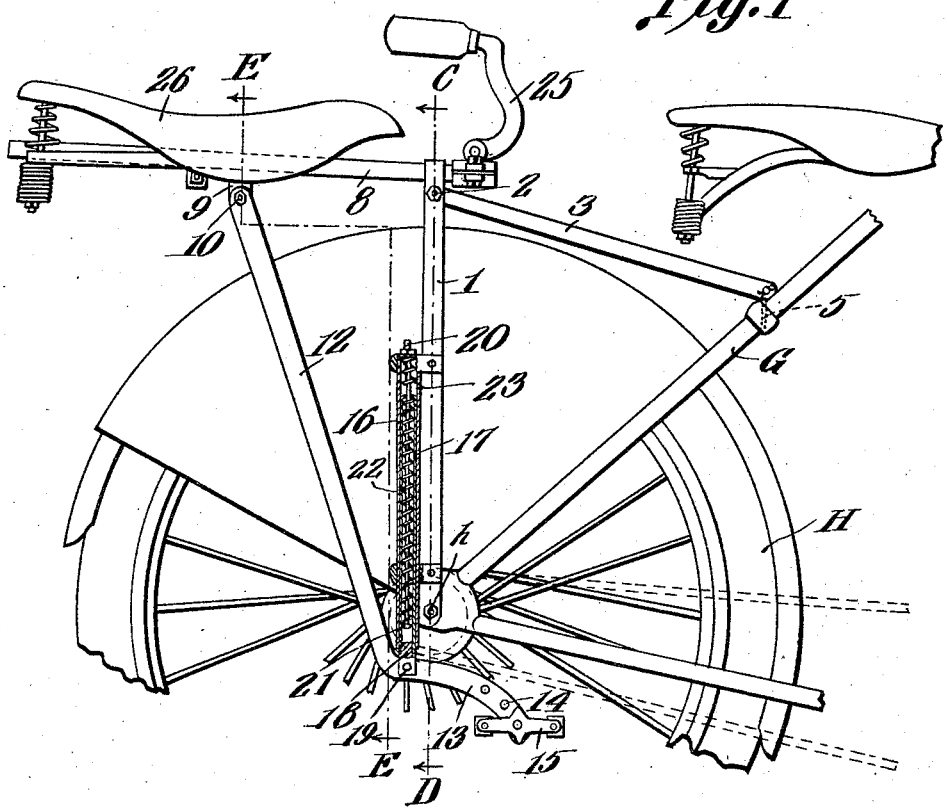
Figure 2:
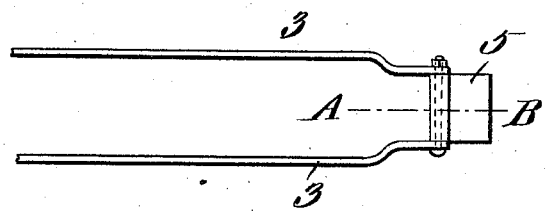
Figure 3:
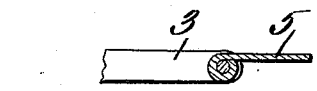

In said drawings:—Figure 1 is a side elevation of the rear portion of a motorcycle and showing the present improvements combined therewith. Fig. 2 is a plan view of the top section of the tandem attachment. Fig. 3 is a section on line A—B Fig. 2. Fig. 4 is a section on line C—D Fig. 1. Fig. 5 is a section on line E—E Fig. 1. Fig. 6 is an enlarged central longitudinal section through the cushioning means of the attachment.

Referring to the figures by characters of reference G designates the rear portion of the frame of a motorcycle.

The attachment constituting the present invention includes two oppositely disposed standards 1 the upper ends of which are preferably curved inwardly and upwardly and are attached, by means of a bolt 2 or the like, to the side strips 3 of the top frame. These side strips, in turn, bear against the ends of a sleeve 4, it being understood that the bolt 2 extends through the sleeve as well as through the strips 3 and the standards 1. The side strips 3 extend forward and are provided, between their front ends, with an attaching plate 5 designed to be secured to the frame G in any suitable manner. Sleeve 4 has an upstanding extension 6 provided with an opening 7 for the reception of saddle bar 8. This saddle bar extends forwardly a slight distance beyond the extension 6 and at an intermediate point the bar is arranged within a split collar 9 supported by a bolt 10. This bolt projects through spacing sleeves 11 and its ends engage the upper terminal portions of movable side strips 12 designed to extend downwardly at opposite sides of the wheel H of the motorcycle. The lower ends of the strips 12 are extended forwardly, as shown at 13 and are provided with a series of openings 14. Pedals 15 are adapted to be placed in engagement with these apertured extensions 13 and are, obviously, adjustable toward or from the free ends of the extensions.

Secured to the standards 1 in any suitable manner are tubular guides 16 closed at their upper ends and open at their lower ends. Slidably mounted within each guide 16 is a tubular slide 17 the lower end of which is preferably closed by means of a screw plug 18. This plug is forked, as shown at 19 and straddles and is pivotally connected to the adjacent extension 13 close to the angle formed by the extension and its side strip 12. A rod 20 is suspended from the upper end of the guide 16 and extends downwardly through an opening in the closed upper end of the slide 17. A head 21 is provided at the lower end of the rod and supports a coiled spring 22 which is housed in the slide and bears upwardly against the upper end of the slide. A buffer spring 23 is also mounted on the rod and is interposed between the upper end of the slide and the upper end of the guide.

The standards 1 have openings 24 in their lower end portions for the reception of the ends of the axle *h* of the wheel H.

The forwardly projecting end portion of the saddle bar 8 has handle bars 25 secured to it and a saddle 26 is mounted on the bar 8 back of the collar 9.

It will be apparent, of course, that under ordinary conditions the springs 22 press upwardly against the upper ends of the slides 17 and thus serve yieldingly to support the side strip 12 and the back portion of the saddle bar. When the weight of a rider is placed on the saddle 26, bar 8 tends to swing downwardly to a slight extent about the bolt 2 as a pivot, thereby causing the slides 17 to move downwardly within the guides 16 and to compress the springs 22. Obviously the springs will act as cushions to prevent undesirable jolting of the occupant of seat 26. The springs 23 serve to prevent the slides from coming abruptly against the upper ends of the guides 16.

What is claimed is:—

1. An attachment for motorcycles and the like, including standards, guides carried thereby, means for attaching the upper and lower ends of the standards to the frame of a bicycle, a saddle bar mounted on and adapted to swing vertically relative to the standards, downwardly extending side strips pivotally connected to the bar, and yielding means within the guides for supporting said side strips.

2. An attachment for motorcycles and the like, including standards, means for attaching the upper and lower ends of the standards to the frame of a motorcycle, a saddle bar pivotally connected to and partly supported by the standards, side strips pivotally connected to and extending downwardly from the bar, yieldable means supporting the lower end portions of the side strips from the standards, and pedal carrying extensions upon the side strips.

3. An attachment for motorcycles and the like, including standards, means for connecting the upper and lower ends thereof to the frame of a motorcycle, guides carried by the standards, a saddle bar partly supported by and adapted to swing relative to the standards, side strips extending downwardly from and pivotally connected to the bar, slides pivotally connected to said strips and mounted within the guides, supporting rods within and depending from the upper ends of the guides, springs carried by said rods and constituting supports for the slides, said springs being housed within the slides, and buffer springs interposed between the slides and the upper end portions of the guides.

4. An attachment for motorcycles and the like, including standards, means for connecting the upper and lower ends thereof to the frame of a motorcycle, guides carried by the standards, a saddle bar partly supported by and adapted to swing relative to the standards, side strips extending downwardly from and pivotally connected to the bar, slides pivotally connected to said strips and mounted within the guides, supporting rods within and depending from the upper ends of the guides, springs carried by said rods and constituting supports for the slides, said springs being housed within the slides, buffer springs interposed between the slides and the upper end portions of the guides, and pedal carrying extensions upon the lower end portions of the side strips.

5. An attachment for motorcycles and the like, including standards, guides carried thereby, means for attaching the upper and lower ends of the standards to the frame of a bicycle, a saddle bar mounted on and adapted to swing vertically relative to the standards, downwardly extending side strips pivotally connected to the bar, yielding means within the guides for supporting said side strips, handle bars connected to the front end portion of the saddle bar, and a saddle mounted on said bar.

In testimony that I claim the foregoing as my own, I have hereto affixed my signature in the presence of two witnesses.

RUSSELL E. ROBESON.

Witnesses:
JOSEPH TODD,
EARL SWANK.